United States Patent
Kishiyama et al.

(10) Patent No.: US 8,270,600 B2
(45) Date of Patent: Sep. 18, 2012

(54) DOWNLINK SCRAMBLING METHOD AND BASE STATION

(75) Inventors: Yoshihisa Kishiyama, Yokosuka (JP);
Kenichi Higuchi, Yokohama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 703 days.

(21) Appl. No.: 12/443,635

(22) PCT Filed: Oct. 1, 2007

(86) PCT No.: PCT/JP2007/069208
§ 371 (c)(1),
(2), (4) Date: May 6, 2009

(87) PCT Pub. No.: WO2008/041676
PCT Pub. Date: Apr. 10, 2008

(65) Prior Publication Data
US 2010/0014660 A1    Jan. 21, 2010

(30) Foreign Application Priority Data
Oct. 3, 2006  (JP) ................................. 2006-272350

(51) Int. Cl.
*H04L 29/06* (2006.01)
(52) U.S. Cl. .......................................... 380/34; 455/59
(58) Field of Classification Search .................. None
See application file for complete search history.

(56) References Cited

U.S. PATENT DOCUMENTS

| | | | |
|---|---|---|---|
| 6,862,314 B1 * | 3/2005 | Jurgensen et al. | 375/142 |
| 6,956,948 B1 * | 10/2005 | Hwang et al. | 380/46 |
| 7,120,467 B2 * | 10/2006 | Umesh et al. | 455/562.1 |
| 7,280,467 B2 * | 10/2007 | Smee et al. | 370/208 |
| 7,315,566 B2 * | 1/2008 | Tanno et al. | 375/142 |
| 7,362,867 B1 * | 4/2008 | Kim et al. | 380/275 |
| 7,420,945 B2 * | 9/2008 | Ponnekanti | 370/334 |
| 7,697,936 B2 * | 4/2010 | Hosono et al. | 455/446 |
| 7,813,329 B2 * | 10/2010 | Mori et al. | 370/342 |
| 7,869,454 B2 * | 1/2011 | Hwang et al. | 370/441 |
| 2002/0150065 A1 * | 10/2002 | Ponnekanti | 370/334 |

(Continued)

FOREIGN PATENT DOCUMENTS

EP    0871297 A2    10/1998

(Continued)

OTHER PUBLICATIONS

NTT DoCoMo, et al., "Scrambling Code in E-UTRA Downlink," 3GPP TSG-RAN WG1 LTE Ad Hoc Meeting R1-060036, Jan. 25, 2006 <URL:http://www.3gpp.org/ftp/tsg_ran/WG1_RL1/TSGR1_AH/LTE_AH_January-06/Docs/R1-060036.zip>, 4 pages.

(Continued)

*Primary Examiner* — Oscar Louie
(74) *Attorney, Agent, or Firm* — Osha Liang LLP

(57) ABSTRACT

A disclosed base station randomizes downlink physical channels in OFDM radio access by scrambling codes suitable for the respective physical channels. The base station includes a base-station-specific scrambling code generating unit configured to generate a base-station-specific scrambling code for randomizing downlink physical channels; a sector-specific orthogonal sequence generating unit configured to generate a sector-specific orthogonal sequence; and a multiplication control unit configured to determine, for each of the physical channels, whether to multiply the base-station-specific scrambling code by the sector-specific orthogonal sequence based on whether each of the physical channels requires soft combining.

8 Claims, 7 Drawing Sheets

U.S. PATENT DOCUMENTS

| | | | |
|---|---|---|---|
| 2003/0095529 A1* | 5/2003 | Petre et al. | 370/342 |
| 2003/0152178 A1* | 8/2003 | Tanno et al. | 375/354 |
| 2004/0131007 A1* | 7/2004 | Smee et al. | 370/208 |
| 2004/0166901 A1* | 8/2004 | Umesh et al. | 455/561 |
| 2005/0169349 A1* | 8/2005 | Hwang et al. | 375/130 |
| 2005/0208959 A1 | 9/2005 | Chen et al. | |
| 2006/0121907 A1* | 6/2006 | Mori et al. | 455/447 |
| 2007/0093268 A1* | 4/2007 | Hosono et al. | 455/561 |
| 2007/0098050 A1* | 5/2007 | Khandekar et al. | 375/146 |

FOREIGN PATENT DOCUMENTS

| | | |
|---|---|---|
| JP | 7-336323 A | 12/1995 |
| JP | 9-261129 A | 10/1997 |
| JP | 2001-119743 A | 4/2001 |
| JP | 2004-349883 A | 12/2004 |

OTHER PUBLICATIONS

NTT DoCoMo, et al., "Scrambling Code in E-UTRA Downlink," 3GPP TSG RAN WG1 Meeting #46bis R1-062712, Oct. 13, 2006 <URL:http://www.3gpp.org/ftp/tsg_ran/WGL_RL1/TSGR1_46bis/Docs/R1-062712.zip>, 6 pages.

International Search Report issued in PCT/JP2007/069208, mailed on Oct. 23, 2007, with translation, 5 pages.

Written Opinion issued in PCT/JP2007/069208, mailed on Oct. 23, 2007, 3 pages.

Extended European Search Report for Application No. 07828948.5 dated Jan. 24, 2012 (8 pages).

* cited by examiner

FIG.1

| PHYSICAL CHANNEL | SCRAMBLING CODE USED |
|---|---|
| PILOT CHANNEL (SECTOR-SPECIFIC ORTHOGONAL SEQUENCE) | BASE-STATION-SPECIFIC SCRAMBLING CODE (SEQUENCE DEDICATED TO PILOT CHANNEL MAY BE USED) |
| SCH | NO SCRAMBLING CODE IS USED |
| BCH | WHEN SOFT COMBINING IS PERFORMED: BASE-STATION-SPECIFIC SCRAMBLING CODE<br>WHEN SOFT COMBINING IS NOT PERFORMED: SECTOR-SPECIFIC SCRAMBLING CODE |
| PCH | WHEN SOFT COMBINING IS PERFORMED: BASE-STATION-SPECIFIC SCRAMBLING CODE<br>WHEN SOFT COMBINING IS NOT PERFORMED: SECTOR-SPECIFIC SCRAMBLING CODE |
| L1/L2 CONTROL CHANNEL | WHEN SOFT COMBINING IS PERFORMED (e.g., PAGING INDICATOR): BASE-STATION-SPECIFIC SCRAMBLING CODE<br>WHEN SOFT COMBINING IS NOT PERFORMED: SECTOR-SPECIFIC SCRAMBLING CODE OR BASE-STATION-SPECIFIC SCRAMBLING CODE (USED IN DOWNLINK (CDM OR FDM) TRANSMISSION WHERE CHANNELS ARE ORTHOGONAL BETWEEN SECTORS) |
| SHARED DATA CHANNEL | SECTOR-SPECIFIC SCRAMBLING CODE OR USER-SPECIFIC SCRAMBLING CODE |
| MBMS CHANNEL | MBMS-SPECIFIC SCRAMBLING CODE OR NO SCRAMBLING CODE IS USED |

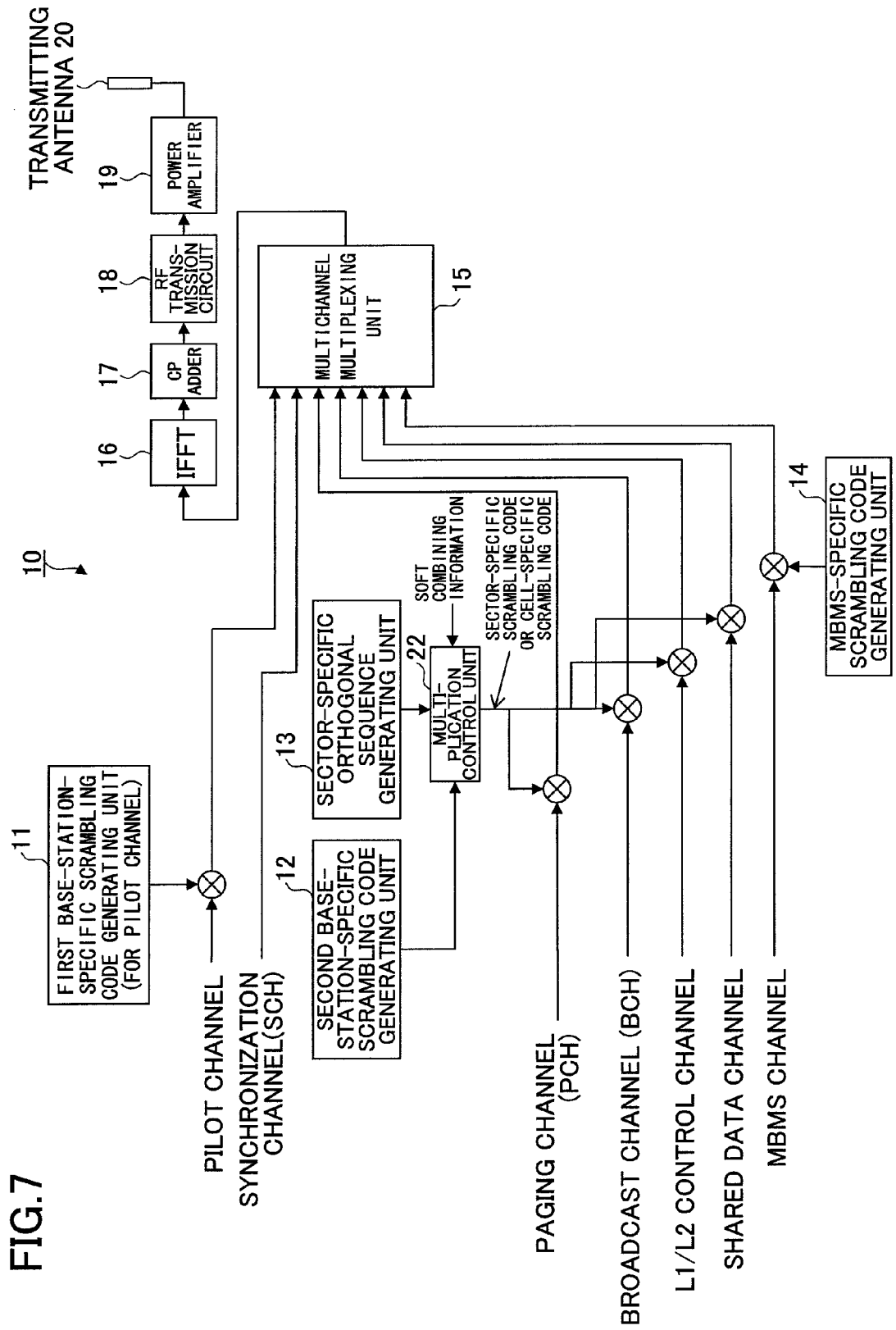

DOWNLINK SCRAMBLING METHOD AND BASE STATION

TECHNICAL FIELD

The present invention generally relates to radio communication control technologies. More particularly, the present invention relates to a method of assigning scrambling codes to downlink physical channels in OFDM radio access and a base station enabling the method.

BACKGROUND ART

In downlink, it is necessary to multiply channels by scrambling codes to randomize other-cell interference. In W-CDMA downlink, all types of physical channels other than the synchronization channel (SCH) are multiplied by a common scrambling code that is unique to each sector. Here, a sector indicates each sub-area of an area (cell) covered by one base station. Currently, the long term evolution (LTE) standard, which is an advanced version of the W-CDMA downlink high-speed data communication standard, is being developed to implement high-speed, high-capacity mobile communications. Scrambling codes are also important to randomize other-cell interference in evolved UTRA (E-UTRA) that is a radio access scheme in LTE.

For example, a method of assigning scrambling codes to physical channels in E-UTRA downlink using OFDM is disclosed in R1-060036, "Scrambling Code in E-UTRA downlink," 3GPP TSG-RAN WG1 LTE Ad Hoc Meeting, Helsinki, Finland, Jan. 23-25, 2006. In the disclosed method, the pilot channel and the broadcast channel (BCH), such as a reference signal and broadcast information, are always multiplied by a cell-specific (base-station-specific) scrambling code and sector-specific orthogonal sequences to orthogonalize downlink channels of different sectors. Also, the paging channel is multiplied by a cell-specific (base-station-specific) scrambling code. Further, shared data channels and layer1/layer2 (L1/L2) control channels are multiplied by a combination of a cell-specific (base-station-specific) scrambling code and an orthogonal sequence when the channels are to be spread or are multiplied by a combination of a long scrambling sequence and a cell-specific (base-station-specific) scrambling code when the channels are not to be spread.

DISCLOSURE OF INVENTION

Problems to be Solved by the Invention

One object of the present invention is to provide a flexible scrambling method suitable for downlink OFDM radio access in LTE and a base station enabling the scrambling method.

Means for Solving the Problems

According to a first aspect of the present invention, a base station includes (a) a base-station-specific scrambling code generating unit configured to generate a base-station-specific scrambling code for randomizing downlink physical channels; (b) a sector-specific orthogonal sequence generating unit configured to generate a sector-specific orthogonal sequence; and (c) a multiplication control unit configured to determine, for each of the physical channels, whether to multiply the base-station-specific scrambling code by the sector-specific orthogonal sequence based on whether each of the physical channels requires soft combining.

The base-station-specific scrambling code is preferably multiplied with a pilot channel; and outputs from the multiplication control unit are preferably multiplied with other physical channels including at least a broadcast channel, a paging channel, and an L1/L2 control channel.

According to a second aspect of the present invention, a base station includes (a) a first base-station-specific scrambling code generating unit configured to generate a first base-station-specific scrambling code for randomizing a pilot channel; (b) a second base-station-specific scrambling code generating unit configured to generate a second base-station-specific scrambling code for randomizing physical channels other than the pilot channel; (c) a sector-specific orthogonal sequence generating unit configured to generate a sector-specific orthogonal sequence; and (d) a multiplication control unit configured to determine, for each of the physical channels, whether to multiply the second base-station-specific scrambling code by the sector-specific orthogonal sequence based on whether each of the physical channels requires soft combining.

The first base-station-specific scrambling code and the second base-station-specific scrambling code preferably have a one to one correspondence.

Advantageous Effect of the Invention

An aspect of the present invention makes it possible to assign suitable scrambling codes to respective physical channels and thereby makes it possible to effectively randomize interference and increase communication capacity.

BRIEF DESCRIPTION OF THE DRAWINGS

FIG. 1 is a table showing the correspondence between downlink physical channels and scrambling codes to be applied to the physical channels according to an embodiment of the present invention;

FIG. 7 is a schematic block diagram illustrating a second example of a configuration of a base station according to an embodiment of the present invention.

EXPLANATION OF REFERENCES

Figure 2:
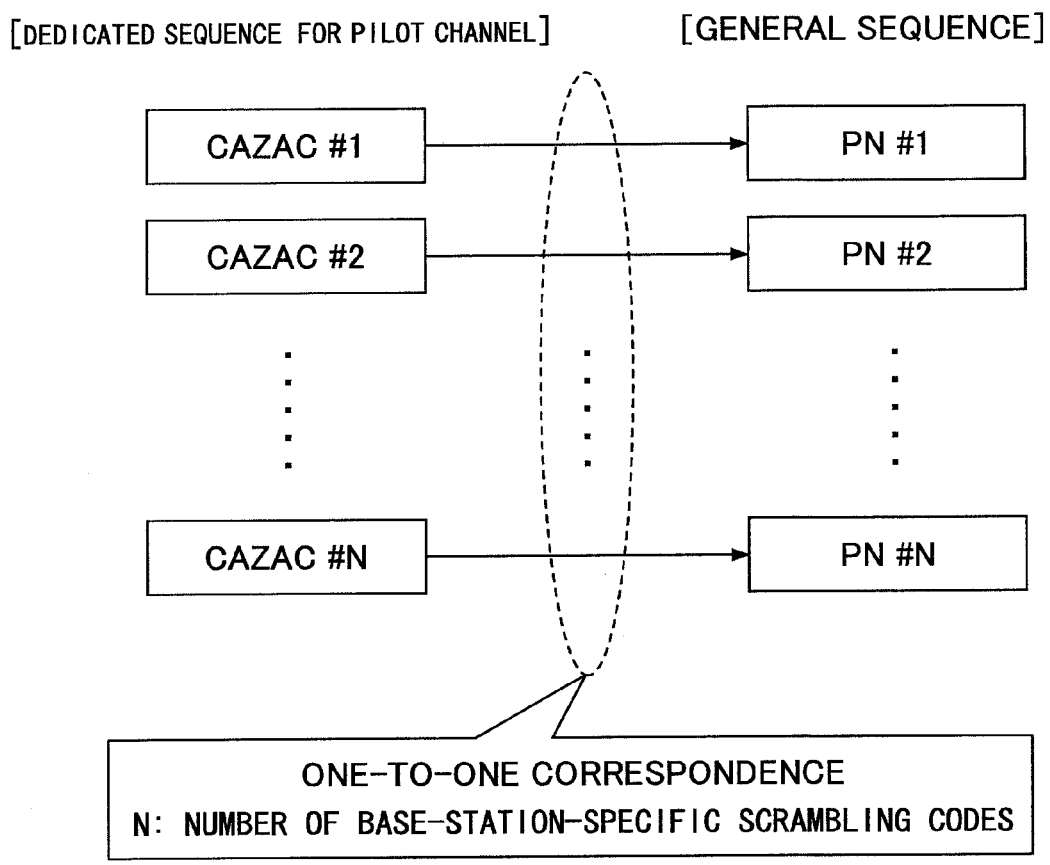
FIG. 2 is a drawing illustrating one-to-one correspondence between dedicated sequences used as base-station-specific scrambling codes for the pilot channel and general sequences used as base-station-specific scrambling codes for other physical channels.

10 Base station
11 First base-station-specific scrambling code generating unit (for pilot channel)
12 Second base-station-specific scrambling code generating unit (for other physical channels)
13 Sector-specific orthogonal sequence generating unit 14 MBMS-specific scrambling code generating unit
15 Multichannel multiplexing unit
16 IFFT unit
17 CP adder
18 RF transmission circuit
19 Power amplifier
20 Antenna
22 Multiplication control unit

BEST MODE FOR CARRYING OUT THE INVENTION

The best mode for carrying out the invention is described based on the following embodiments with reference to the accompanying drawings. According to an embodiment of the present invention, suitable scrambling codes are assigned to downlink physical channels according to types of the channels. First, types of scrambling codes used to scramble downlink channels are described. In this embodiment, scrambling codes include base-station-specific (sector-common) scrambling codes, sector-specific scrambling codes, user-specific scrambling codes, and multimedia broadcast multicast service (MBMS) specific scrambling codes.

(1) Base-Station-Specific (Sector-Common) Scrambling Code

The base-station-specific scrambling code is a unique code assigned to each base station. Basically, one base-station-specific scrambling code is assigned to one base station. Therefore, one common scrambling code is used for different sectors belonging to the same base station.

However, in some telecommunications carriers, it is allowed to assign multiple scrambling codes to one base station. In this case, it is possible to use one common scrambling code for a group of sectors belonging to the same base station. For example, when sectors 1 through 6 belong to a base station, a common scrambling code SC1 is used for sectors 1 and 3, and a common scrambling code SC2 is used for sectors 2, 4, 5, and 6.

As the base-station-specific scrambling code, a dedicated sequence, which is different from a sequence used for other channels, may be assigned to the pilot channel. For example, a constant amplitude zero auto-correlation (CAZAC) sequence may be used for the pilot channel and a pseudo random noise (PN) sequence, which is more general, may be used for other physical channels. The CAZAC sequence and the PN sequence used as the base-station-specific scrambling code by a base station correspond one to one with each other. This one-to-one correspondence is described later.

(2) Sector-Specific Scrambling Code

The sector-specific scrambling code is a unique code assigned to each sector. In this embodiment, multiple sector-specific scrambling codes are derived from the base-station-specific scrambling code. For example, a sector-specific scrambling code for a sector is generated by multiplying the base-station-specific scrambling code by an orthogonal sequence that is unique to the sector.

(3) User-Specific Scrambling Code

The user-specific scrambling code is a unique code assigned to each user terminal (ID). The user-specific scrambling code prevents data of a user from being demodulated by a different user.

(4) MBMS-Specific Scrambling Code

The MBMS-specific scrambling code is a unique code assigned to each multimedia broadcast multicast service and is used in an area (including multiple base stations) where the MBMS service is provided. The MBMS-specific scrambling code is used to randomize interference at a boundary between MBMS services.

Next, the correspondence between physical channels and scrambling codes to be applied is described with reference to FIG. 1.

(1) Pilot Channel

A base-station-specific scrambling code is assigned to the pilot channel. The pilot channel is a sector-specific orthogonal sequence generated for each sector. The base-station-specific scrambling code used to randomize the pilot channel may be either a dedicated sequence used solely for the pilot channel or a general sequence used both for the pilot channel and other physical channels. In the example shown in FIG. 2, the pilot channel is scrambled by a dedicated sequence that is unique to each base station and other physical channels are scrambled by a general sequence. As a dedicated sequence for the pilot channel, for example, a CAZAC sequence or an extract from a CAZAC sequence may be used. As a general sequence, for example, a PN sequence or an extract from a PN sequence may be used. The dedicated sequence for the pilot channel (e.g., a CAZAC sequence) and the general sequence (e.g., a PN sequence) used by a base station correspond one to one with each other.

In FIG. 2, a CAZAC sequence #1 dedicated to the pilot channel and a general sequence (PN sequence) #1 for other physical channels are provided for a base station (node B) #1, and the CAZAC sequence #1 and the PN sequence #1 correspond one to one with each other. Similarly, a CAZAC sequence #2 dedicated to the pilot channel and a general sequence (PN sequence) #2 for other physical channels are provided for a base station #2, and the CAZAC sequence #2 and the PN sequence #2 correspond one to one with each other. When a CAZAC sequence #N of a base station is detected in a cell search, the user terminal (UE) can determine the corresponding general sequence #N of the base station based on the detected CAZAC sequence #N.

A dedicated sequence for the pilot channel and a general sequence for other channels may have either different lengths and cycles or the same length and cycle.

Using a dedicated sequence suitable for channel estimation to scramble the pilot channel makes it possible to more appropriately allocate radio resources to user terminals.

(2) Synchronization Channel

As shown in FIG. 1, there is no need to randomize the synchronization channel (SCH). In other words, the synchronization channel is not multiplied by a scrambling code.

(3) Broadcast Channel (BCH)

Different scrambling codes are used to scramble the broadcast channel (BCH) depending on whether soft combining is performed within an area covered by the same base station. In soft combining, a user terminal in an area (e.g., a cell covered by a base station) combines multiple instances of the same signal arriving via different sectors or multiple paths within a guard interval of OFDM transmission. Soft combining can be applied to channels that may be used to transmit the same signal to multiple sectors. Examples of such channels include a broadcast channel containing broadcast information that is common to multiple sectors, a paging channel that is common to multiple sectors, and an L1/L2 control channel for transmitting a paging indicator that is common to multiple sectors.

If soft combining is to be performed, a base-station-specific scrambling code that is common to multiple sectors is used. As the base-station-specific scrambling code, a general sequence such as a PN sequence may be used. The base-station-specific scrambling code used here is not necessarily the only-one scrambling code provided for the base station, but may be one of multiple base-station-specific scrambling codes provided for the base station. Meanwhile, if soft combining is not to be performed, the broadcast channel is multiplied by sector-specific scrambling codes to reduce inter-sector interference.

Whether soft combining is necessary is determined, for example, based on location information of the user terminal. When the user terminal is located at a cell boundary or a sector boundary, the reception quality of the user terminal may be reduced because of the interference between cells or sectors. In this case, the user terminal soft-combines instances of the same signal arriving from multiple sectors or paths within a guard interval to achieve delay diversity and thereby improve the reception quality.

Alternatively, when a communication system is designed not to perform soft combining for the broadcast channel, the base station may be configured to always multiply the broadcast channel by cell-specific scrambling codes.

(4) Paging Channel (PCH)

As in the case of the broadcast channel, different scrambling codes are used to scramble the paging channel (PCH) depending on whether soft combining is performed within an area covered by the same base station. If soft combining is to be performed within an area covered by the same base station, the paging channel is multiplied by a base-station-specific scrambling code. As the base-station-specific scrambling code, a general sequence such as a PN sequence may be used. Meanwhile, if soft combining is not to be performed, the paging channel is randomized by sector-specific scrambling codes.

Alternatively, when a communication system is designed to always perform soft combining for the paging channel, the base station may be configured to always multiply the paging channel by a base-station-specific scrambling code.

(5) L1/L2 Control Channel

As in the case of the broadcast channel and the paging channel, the L1/L2 control channel is multiplied by a base-station-specific scrambling code if soft combining is to be performed within an area covered by the same base station. Meanwhile, if soft combining is not to be performed, the L1/L2 control channel is randomized by sector-specific scrambling codes.

However, in downlink (CDM or FDM) transmission where channels of different sectors are orthogonal to each other, the L1/L2 control channel may be randomized by a base-station-specific scrambling code even if soft combining is not to be performed.

(6) Shared Data Channel

The shared data channel is multiplied by a sector-specific scrambling code or a user-specific scrambling code.

(7) MBMS Channel

The MBMS channel is multiplied by an MBMS-specific scrambling code. If areas where MBMS services are provided are not adjacent to each other, it may not be necessary to scramble the MBMS channel.

Figure 3:
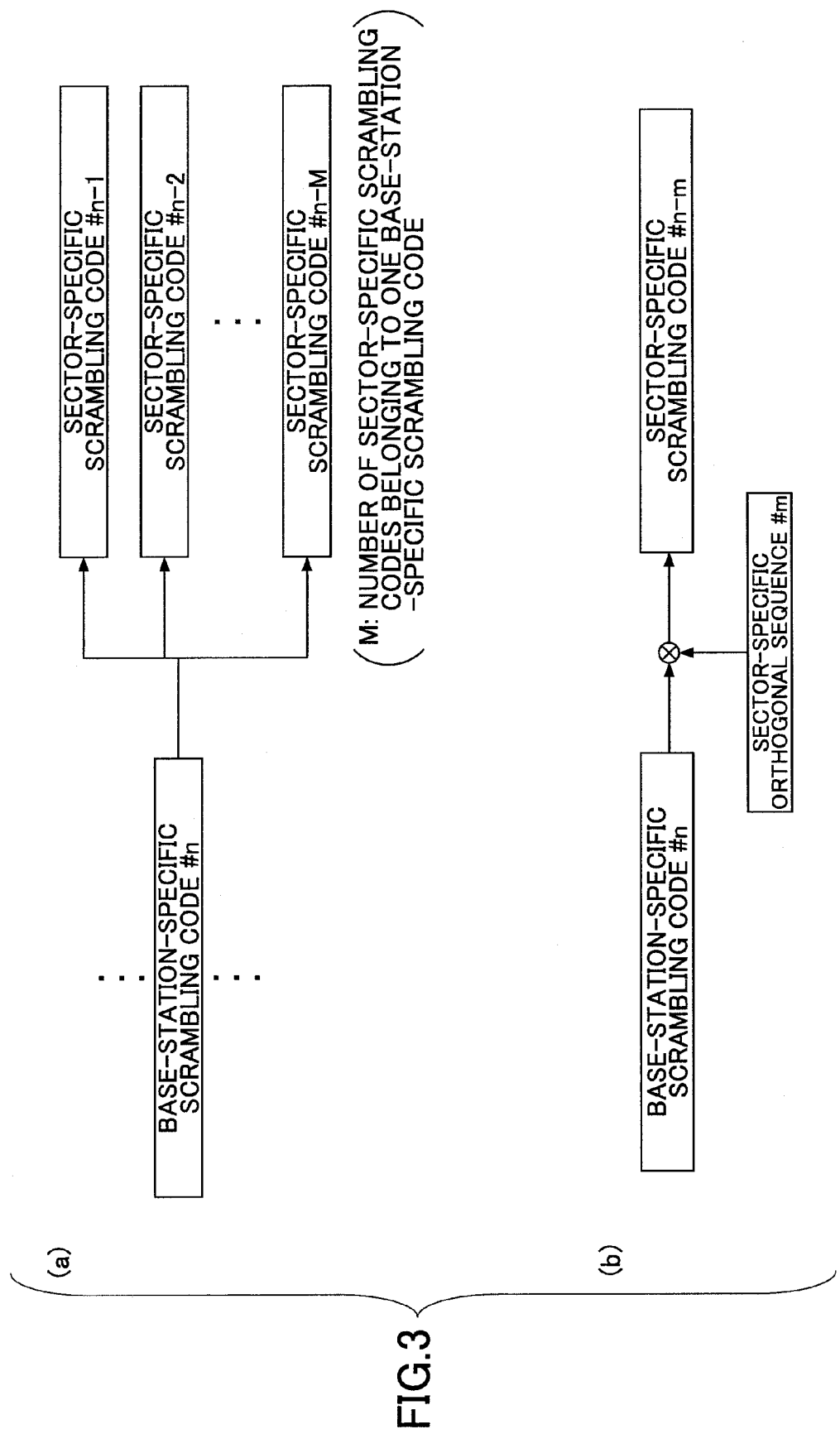
FIG. 3 is a drawing used to describe a process of generating sector-specific scrambling codes from a base-station-specific scrambling code according to an embodiment of the present invention.

FIG. 3 shows a relationship between a base-station-specific scrambling code and sector-specific scrambling codes. As shown by FIG. 3 (a), each base station is assigned a base-station-specific scrambling code. In this example, a base-station-specific scrambling code #n is assigned to a base station #n. M sectors belong to the base station #n. In other words, M sector-specific scrambling codes are used by the base station #n. In FIG. 3 (a), sector-specific scrambling codes #n−1 through #n−M are used by the base station #n.

As shown by FIG. 3 (b), a sector-specific scrambling code #n−m (m indicates a natural number from 1 to M) is generated by multiplying the base-station-specific scrambling code #n by an orthogonal sequence #m that is unique to the corresponding sector.

Figure 4:
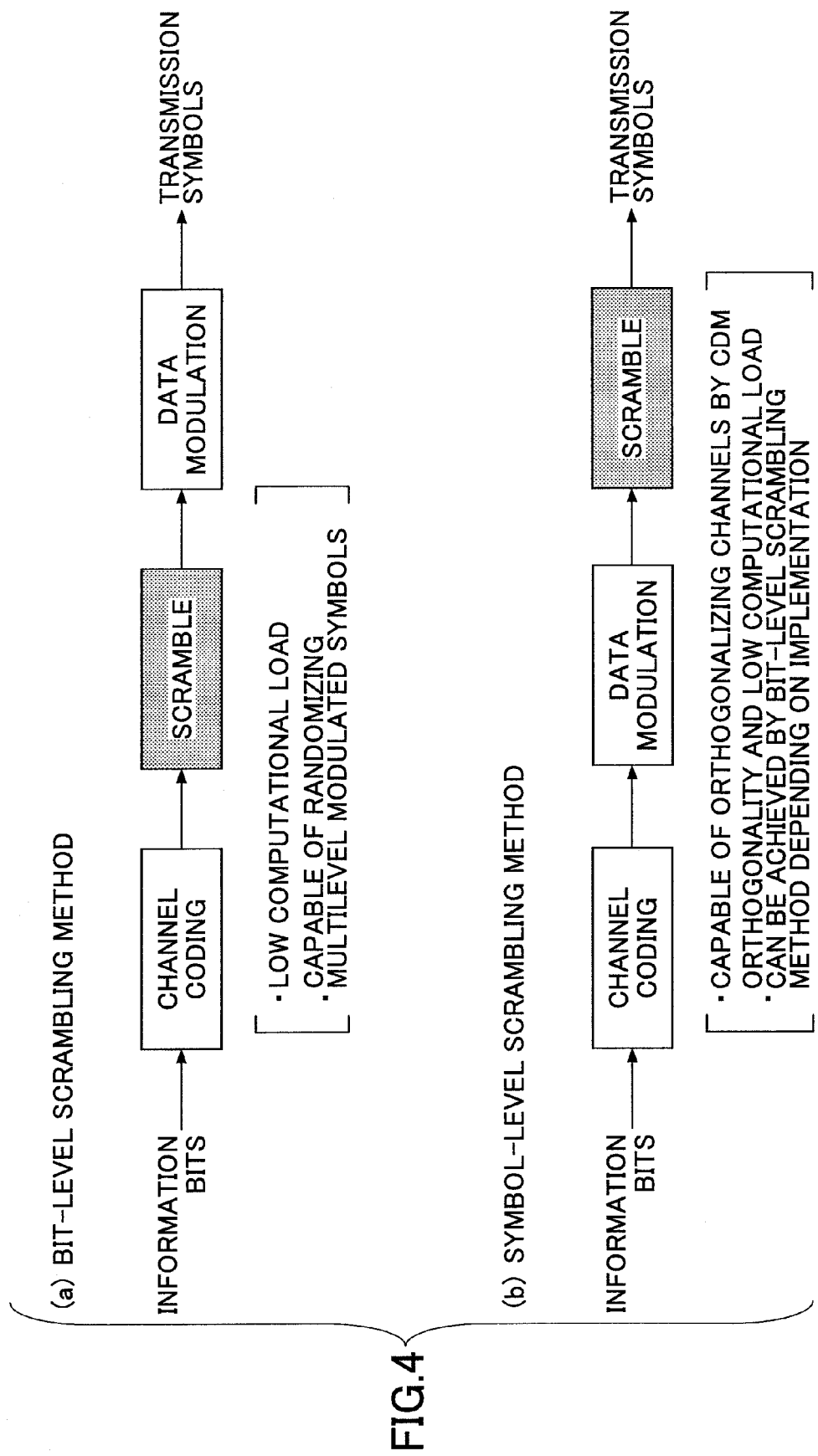
FIG. 4 is a drawing illustrating exemplary scrambling methods.

FIG. 4 is a drawing illustrating exemplary scrambling methods. FIG. 4 (a) shows a bit-level scrambling method and FIG. 4 (b) shows a symbol-level scrambling method. In the bit-level scrambling method, channel-encoded information bits are scrambled and then modulated. With this method, because a channel-encoded binary sequence is multiplied by a scrambling code, the computational load is small. Also, because modulation is performed after scrambling, multilevel modulated symbols are also randomized.

In the symbol-level scrambling method, information bits are channel-encoded, modulated, and then scrambled to generate transmission symbols. With this method, channels are orthogonalized by code division multiplexing (CDM). Meanwhile, by setting appropriate limits in the implementation of the bit-level scrambling method, it is also possible to achieve orthogonality that is equivalent to that provided by the symbol-level scrambling method while maintaining the computational load at a low level.

Figure 5:
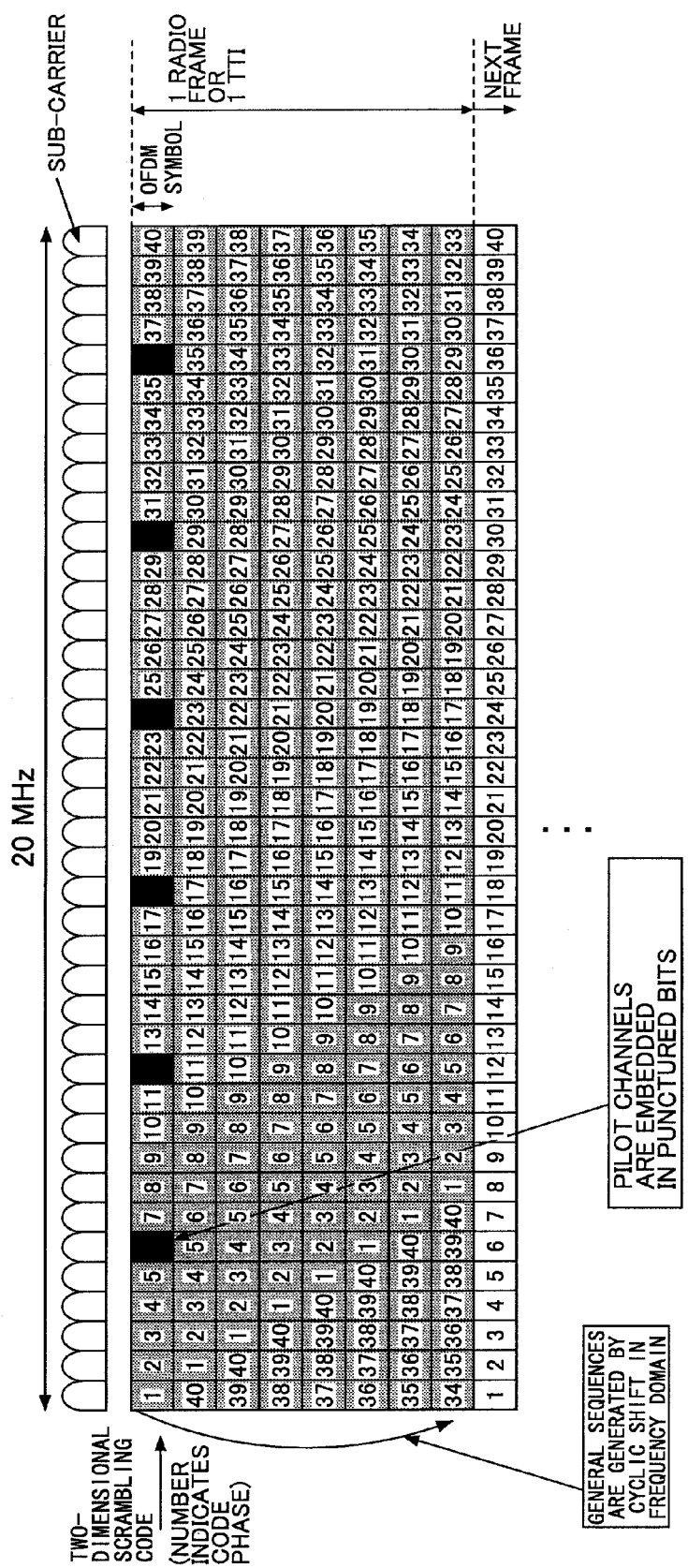
FIG. 5 is a drawing illustrating an exemplary method of generating a two-dimensional scrambling pattern of general sequences to be applied to physical channels other than the pilot channel.

FIG. 5 is a drawing illustrating an exemplary method of generating a two-dimensional (time and frequency) scrambling pattern of general sequences. In this example, 40 sub-carriers are arranged in the frequency direction and one radio frame or transmission time interval (TTI) is composed of 8 OFDM symbols. The shaded area indicates one cycle, i.e., one TTI in this example. Numbers in respective blocks indicate phases of the scrambling code.

In FIG. 5, general sequences are generated by cyclic shift in the frequency domain. Pilot channels are embedded in punctured bits. The general sequences and the dedicated sequences for the embedded pilot channels correspond one to one with each other as described above.

Figure 6:
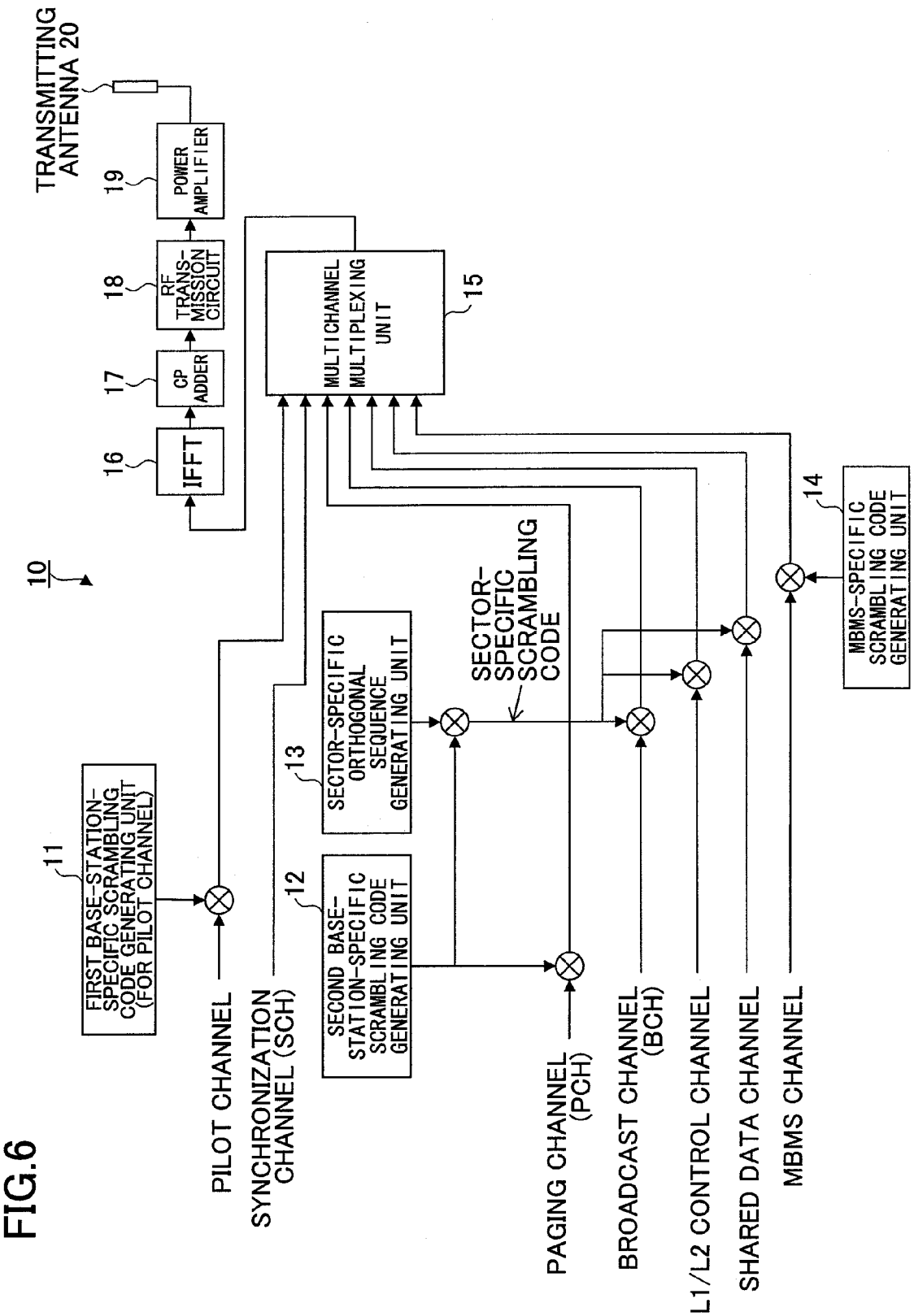
FIG. 6 is a schematic block diagram illustrating a first example of a configuration of a base station according to an embodiment of the present invention.

FIG. 6 is a schematic block diagram illustrating a base station 10 according to an embodiment of the present invention. In the base station 10, a pilot channel, a synchronization channel (SCH), a paging channel (PCH), a broadcast channel (BCH), an L1/L2 control channel, a shared data channel, and an MBMS channel are generated by channel generating units (not shown) and are encoded by channel coding units (not shown). For example, a pilot channel generating unit (not shown) generates a pilot channel that is a unique orthogonal sequence for each sector.

The base station 10 includes a first base-station-specific scrambling code generating unit 11 for generating a first base-station-specific scrambling code for randomizing the pilot channel, a second base-station-specific scrambling code generating unit 12 for generating a second base-station-specific scrambling code for randomizing physical channels other than the pilot channel, a sector-specific orthogonal sequence generating unit 13 for generating sector-specific orthogonal sequences used to generate sector-specific scrambling codes, and an MBMS-specific scrambling code generating unit 14 for generating an MBMS-specific scrambling code. Sector-specific scrambling codes are generated by multiplying the second base-station-specific scrambling code generated by the second base-station-specific scrambling code generating unit 12 by the orthogonal sequences generated by the sector-specific orthogonal sequence generating unit 13.

In the example shown in FIG. 6, the first base-station-specific scrambling code generated by the first base-station-specific scrambling code generating unit 11 is dedicated to the pilot channel and is used to multiply the pilot channel. The second base-station-specific scrambling code generated by the second base-station-specific scrambling code generating unit 12 is used as a general sequence to multiply the paging channel. Here, it is assumed that the paging channel is to be soft-combined.

The second base-station-specific scrambling code is multiplied by the sector-specific orthogonal sequences generated by the sector-specific orthogonal sequence generating unit 13 to generate sector-specific scrambling codes. In this example, the sector-specific scrambling codes are used to multiply the broadcast channel, the L1/L2 control channel, and the shared data channel for which soft combining is not to be performed.

The MBMS-specific scrambling code generated by the MBMS-specific scrambling code generating unit 14 is used to multiply the MBMS channel.

Scrambled and modulated channels are multiplexed and assigned to orthogonal subcarriers by the multichannel multiplexing unit 15 and are thereby mapped to a complex plane. Then, an IFFT unit 16 inverse-fast-Fourier-transforms the multiplexed signal, a CP adder 17 adds cyclic prefixes (CP) to the multiplexed signal, an RF transmission circuit 18 converts the multiplexed signal into an RF signal, and a power amplifier 19 amplifies the RF signal. The amplified RF signal is then transmitted from an antenna 20.

The above configuration makes it possible to randomize physical channels with suitable scrambling codes based on whether soft combining is necessary and to transmit the randomized physical channels to user terminals. This in turn makes it possible to effectively reduce interference between cells or sectors.

In the example shown in FIG. 6, a base-station-specific scrambling code dedicated to the pilot channel is generated by the first base-station-specific scrambling code generating unit 11. However, it is not always necessary to use a dedicated sequence for the pilot channel. For example, a base-station-specific scrambling code made of a general sequence may be used for all physical channels excluding the MBMS channel. In this case, the first base-station-specific scrambling code generating unit 11 shown in FIG. 6 may be omitted and the pilot channel may be multiplied by an output from the second base-station-specific scrambling code generating unit 12.

Also, although not shown in figures, the base station 10 may also include a user-specific scrambling code generating unit and may be configured to multiply the shared data channel by a user-specific scrambling code according to the degree of interference.

FIG. 7 shows a variation of the base station 10 of FIG. 6. The base station 10 of FIG. 7 includes a multiplication control unit 22 that determines whether it is necessary to multiply the second base-station-specific scrambling code by a sector-specific orthogonal sequence based on information indicating whether soft combining is necessary. For a physical channel not requiring soft combining, the multiplication control unit 22 multiplies the second base-station-specific scrambling code by a sector-specific orthogonal sequence and thereby generates and outputs a sector-specific scrambling code. For a physical channel requiring soft combining, the multiplication control unit 22 does not multiply the second base-station-specific scrambling code by an orthogonal sequence and outputs the second base-station-specific scrambling code as is. Although the multiplication control unit 22 is represented by one block in FIG. 7, the multiplication control unit 22 is provided for each type of physical channel.

Outputs from the multiplication control unit 22 are used to randomize the paging channel, the broadcast channel (BCH), and the L1/L2 control channel.

In this example, the shared data channel is basically multiplied by a sector-specific scrambling code obtained by multiplying the second base-station-specific scrambling code and a sector-specific orthogonal sequence. Alternatively, the shared data channel may be multiplied by a user-specific scrambling code.

The present invention is not limited to the specifically disclosed embodiments, and variations and modifications may be made without departing from the scope of the present invention.

The present international application claims priority from Japanese Patent Application No. 2006-272350 filed on Oct. 3, 2006, the entire contents of which are hereby incorporated herein by reference.

The invention claimed is:

1. A base station, comprising:
   a first base-station-specific scrambling code generating unit configured to generate a first base-station-specific scrambling code for randomizing a pilot channel;
   a second base-station-specific scrambling code generating unit configured to generate a second base-station-specific scrambling code for randomizing predetermined physical channels other than the pilot channel;
   a sector-specific orthogonal sequence generating unit configured to generate a sector-specific orthogonal sequence;
   a multiplication control unit configured to output the second base-station-specific scrambling code or a result of multiplying the second base-station-specific scrambling code by the sector-specific orthogonal sequence for each of the predetermined physical channels based on whether each of the predetermined physical channels requires soft combining; and
   a multiplying unit configured to multiply each of the predetermined physical channels by the, second base-station-specific scrambling code or the result of multiplying the second base-station-specific scrambling code by the sector-specific orthogonal sequence that is output from the multiplication control unit,
   wherein the first base-station-specific scrambling code and the second base-station-specific scrambling code have a one-to-one correspondence.

2. The base station as claimed in claim 1, wherein the multiplication control unit is configured to output the second base-station-specific scrambling code without multiplying by the sector-specific orthogonal sequence for a predetermined physical channel requiring soft combining.

3. The base station as claimed in claim 1, wherein the multiplication control unit is configured to multiply the second base-station-specific scrambling code by the sector-specific orthogonal sequence and to output the multiplication result for a predetermined physical channel not requiring soft combining.

4. The base station as claimed in claim 1, wherein the multiplication control unit is configured to use a scrambling code unique to each mobile station to randomize a shared data channel.

5. The base station as claimed in claim 1, further comprising:
   an MBMS-specific scrambling code generating unit configured to generate an MBMS-specific scrambling code for randomizing an MBMS channel.

6. The base station as claimed in claim 1, further comprising:
   a pilot channel generating unit configured to generate a sector-specific orthogonal sequence for each sector as the pilot channel.

7. A downlink scrambling method, comprising the steps of:
   randomizing a pilot channel by multiplying the pilot channel by a first base-station-specific scrambling code;

randomizing predetermined physical channels other than the pilot channel by multiplying the predetermined physical channels by a scrambling code; and transmitting a signal including the pilot channel and the predetermined physical channels other than the pilot channel via downlink, wherein
- a second base-station-specific scrambling code is used as the scrambling code to multiply a predetermined physical channel requiring soft combining;
- a result of multiplying the second base-station-specific scrambling code by a sector-specific orthogonal sequence is used as the scrambling code to multiply a predetermined physical channel not requiring soft combining; and the first base-station-specific scrambling code and the second base-station-specific scrambling code have a one-to-one correspondence.

8. The downlink scrambling method as claimed in claim 7, further comprising the step of:
- randomizing a shared data channel by multiplying the shared data channel by the result of multiplying the second base-station-specific scrambling code by the sector-specific scrambling sequence or a user-specific scrambling code.

* * * * *